(12) United States Patent
Arar et al.

(10) Patent No.: US 7,269,952 B2
(45) Date of Patent: Sep. 18, 2007

(54) METHOD AND APPARATUS FOR GAS TURBINE DRY LOW NOX COMBUSTOR CORRECTED PARAMETER CONTROL

(75) Inventors: Malath Ibrahim Arar, Clifton Park, NY (US); Robert Russell Priestley, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 10/906,689

(22) Filed: Mar. 2, 2005

(65) Prior Publication Data

US 2006/0196190 A1 Sep. 7, 2006

(51) Int. Cl.
*F02C 9/28* (2006.01)
(52) U.S. Cl. .................. 60/773; 60/39.281
(58) Field of Classification Search ......... 60/39.27, 60/39.281, 773, 794; 123/704
See application file for complete search history.

(56) References Cited

U.S. PATENT DOCUMENTS

| 4,568,266 A | 2/1986 | Bonne | 431/76 |
|---|---|---|---|
| 4,768,491 A * | 9/1988 | Nishida | 123/494 |
| 5,319,919 A | 6/1994 | Nakayama et al. | 60/39.03 |
| 5,327,718 A | 7/1994 | Iwata et al. | 60/39.03 |
| 5,339,620 A | 8/1994 | Ikeda et al. | 60/39.03 |
| 5,477,670 A | 12/1995 | Ikeda et al. | 60/39.03 |
| 5,704,205 A | 1/1998 | Hepner et al. | 60/39.03 |
| 6,003,299 A | 12/1999 | Idleman | 60/39.23 |
| 6,490,858 B2 * | 12/2002 | Barrett et al. | 60/280 |
| 6,708,496 B2 | 3/2004 | Gadde et al. | 60/773 |
| 2004/0011050 A1 * | 1/2004 | Inoue | 60/773 |

FOREIGN PATENT DOCUMENTS

JP 63-159637 * 7/1988 ......... 123/704

* cited by examiner

*Primary Examiner*—L. J. Casaregola
(74) *Attorney, Agent, or Firm*—Cantor Colburn LLP

(57) ABSTRACT

A method for controlling a combustor of an engine, the combustor having a fuel to oxidant ratio, the fuel to oxidant ratio being defined as a ratio of an amount of fuel supplied to the combustor divided by an amount of oxygen in an oxidant stream supplied to the combustor includes controlling the fuel to oxidant ratio of the combustor as a function of the amount of oxygen in the oxidant stream.

20 Claims, 1 Drawing Sheet

METHOD AND APPARATUS FOR GAS TURBINE DRY LOW NOX COMBUSTOR CORRECTED PARAMETER CONTROL

BACKGROUND OF THE INVENTION

This application relates generally to combustors and, more particularly, to gas turbine combustors.

A present thrust of gas turbine engine technology seeks to attain reduced emissions of nitrogen (NOx) and hydrocarbon compounds. Techniques for accomplishing such reduced emissions often result in reduced thermodynamic efficiency or substantially increased capital costs.

NOx compounds are produced by a reaction of the nitrogen in an oxidant at elevated temperatures conventionally found in the combustors of a gas turbine engine. NOx formation can be reduced by reducing the maximum flame temperature in the combustor. Injection of steam into the combustor reduces the maximum flame temperature in the combustor at a cost in thermodynamic efficiency. Penalties must also be paid in water use, including water treatment capital outlay and operating costs. The amount of steam injection, and its associated cost, rises with the amount of NOx reduction desired. Some states and foreign countries have announced targets for NOx reduction that infer such large quantities of steam that this solution appears less desirable for future systems.

Reduction or elimination of hydrocarbon emissions is also attainable by ensuring complete combustion of the fuel in the combustor. Complete combustion requires a lean fuel-oxidant mixture. As the fuel-oxidant mixture is made leaner, a point is reached at which combustion can no longer be supported. Thus, significant research has been conducted to reduce the maximum flame temperature, while still permitting efficient operation of the combustor.

Dry low NOx combustion, which limits NOx formation by lowering flame temperatures through fuel/oxidant optimization, has been developed. Dry low-NOx combustors control fuel and oxidant mixing to create larger and more branched flames, reduce peak flame temperatures, and lower the amount of NOx formed. In principle, there are three stages in a conventional dry low-NOx combustor: combustion, reduction, and burnout. In the initial stage, combustion occurs in a fuel-rich, oxygen-deficient zone where the NOx is formed. A reducing atmosphere follows, where hydrocarbons are formed and react with the already formed NOx. In the third stage, internal oxidant staging completes the combustion.

While dry low NOx combustion in a gas turbine has produced gains in the effort to reduce NOx emissions, dry low NOx combustion is sensitive to changes in oxygen content in the combustor oxidant. Oxidant supplied to the combustor is usually composed of ambient air brought in through a compressor that has varying oxygen content due to dilution with ambient water vapor and possibly additional water vapor from an evaporative cooler or other device that cools inlet air through evaporation of water. In addition, other diluents (such as steam, nitrogen or liquid water) are occasionally added to the oxidant before or during the combustion process. Thus, it is desirable to determine the oxygen content in the total oxidant.

BRIEF DESCRIPTION OF THE INVENTION

Exemplary embodiments of the invention include a method for controlling a combustor of an engine, the combustor having a fuel to oxidant ratio, the fuel to oxidant ratio being defined as a ratio of an amount of fuel supplied to the combustor divided by an amount of oxygen in an oxidant stream supplied to the combustor. The method includes controlling the fuel to oxidant ratio of the combustor as a function of the amount of oxygen in the oxidant stream.

Further exemplary embodiments of the invention include a gas turbine engine having an oxidant stream and a fuel supply. The gas turbine engine includes a turbine, a compressor, a combustor, an oxygen sensor, a fuel system and a controller. The compressor is in mechanical communication with the turbine. The combustor is in fluid communication with both the turbine and the compressor. The combustor receiving the oxidant stream and the fuel supply. The oxygen sensor adapted to produce an oxygen level signal responsive to an amount of oxygen in the oxidant stream. The fuel system provides the fuel supply to the combustor. The controller is in electrical communication with the oxygen sensor, the compressor and the fuel supply system.

The above, and other objects, features and advantages of the present invention will become apparent from the following description read in conjunction with the accompanying drawings, in which like reference numerals designate the same elements.

BRIEF DESCRIPTION OF THE DRAWINGS

These and other advantages of the invention will be more apparent from the following description in view of the drawing that shows.

DETAILED DESCRIPTION OF THE INVENTION

Figure 1:
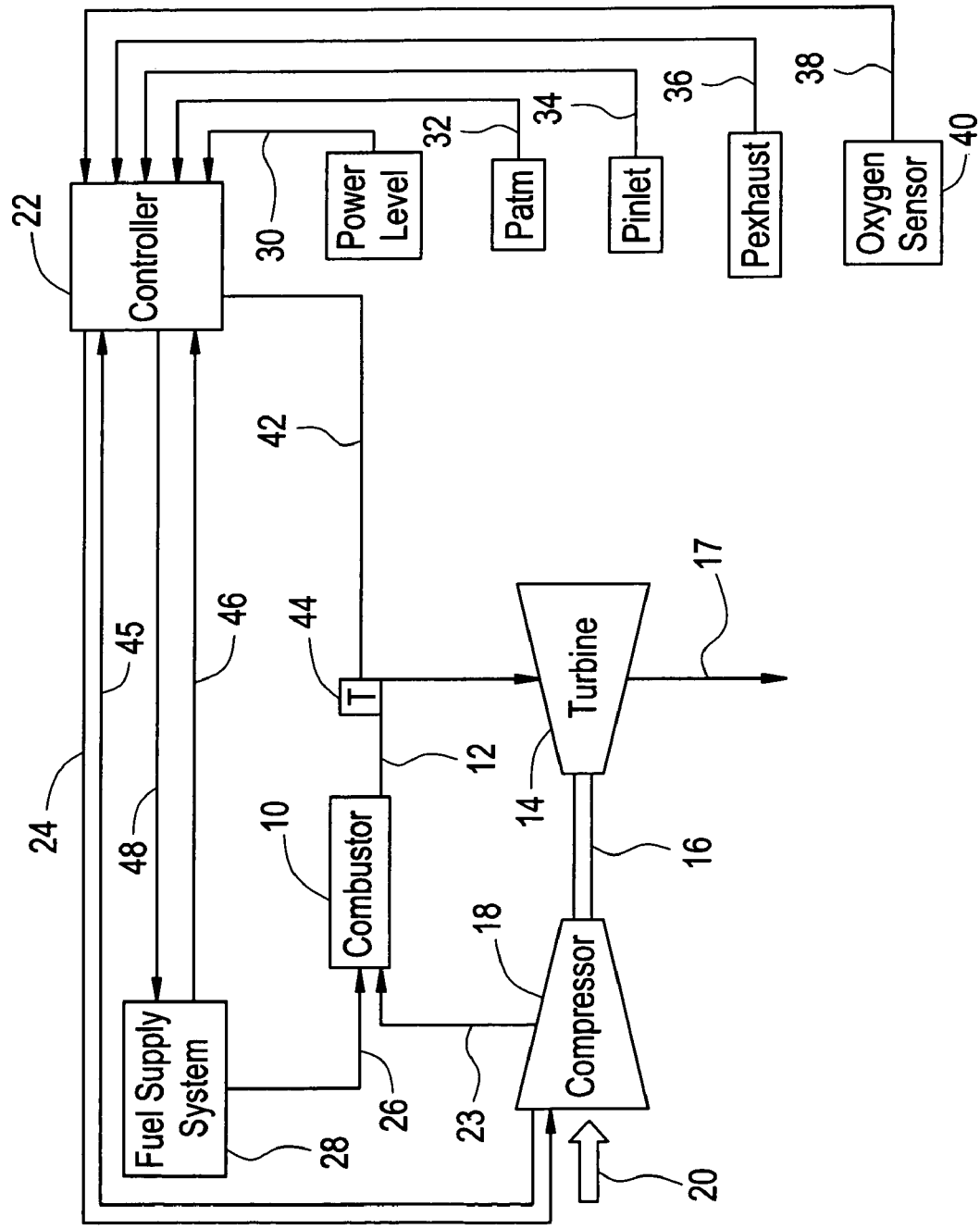
FIG. 1 is a schematic diagram of a gas turbine engine using oxygen content to control a combustor according to an exemplary embodiment of the present invention.

FIG. 1 shows an exemplary embodiment of a gas turbine engine. The gas turbine engine includes a combustor 10. Combustor 10 burns a fuel-oxidant mixture to produce a flow of gas 12 which is hot and energetic. The flow of gas 12 from the combustor 10 then travels to a turbine 14. The turbine 14 includes an assembly of turbine blades (not shown). The flow of gas 12 imparts energy on the assembly of turbine blades causing the assembly of turbine blades to rotate. The assembly of turbine blades is coupled to a shaft 16. The shaft 16 rotates in response to a rotation of the assembly of turbine blades. The shaft 16 is then used to power a compressor 18. The shaft 16 can optionally provide a power output 17 to a different output device (not shown), such as, for example, an electrical generator. The compressor 18 takes in an oxidant stream 20. A flow of the oxidant stream 20 is controllable by a controller 22. Controller 22 uses an airflow adjustment signal 24 to control a geometry of an air inlet device (not shown) of the compressor 18. The oxidant stream 20 is compressed in the compressor 18. Following compression of the oxidant stream 20 a compressed oxidant stream 23 is fed into the combustor 10. The compressed oxidant stream 23 from the compressor 18 is mixed with a fuel flow 26 from a fuel supply system 28 to form the fuel-oxidant mixture inside the combustor 10. The fuel-oxidant mixture then undergoes a burning process in the combustor 10.

The oxidant stream 20 input into the compressor 18 includes a plurality of components. The plurality of components include a dry air component and a water vapor component. The water vapor component is due to local ambient conditions as well as to evaporation of additional water for cooling purposes into the compressor inlet flow. Atmospheric dry air contains a nitrogen component, an oxygen component, an argon component, a carbon dioxide component, and additional trace components of very low concentration such that they may be ignored. Each dry air component exists in a specific proportion relative to the overall quantity of atmospheric dry air. The oxidant stream 20 includes the atmospheric dry air and water vapor. When the oxidant stream 20 is compressed in the compressor 18, it is fed into the combustor 10 as the compressed oxidant stream 23. The compressed oxidant stream 23 may include components other than atmospheric air. Thus, a concentration of oxygen in atmospheric air may not be same as a concentration of oxygen in the compressed oxidant stream 23. Since the amount of oxygen in the compressed oxidant stream 23 directly impacts the burning process in the combustor 10, it is important to know the amount of oxygen in the compressed oxidant stream 23. Oxygen in the compressed oxidant stream 23 combines with the fuel from the fuel flow 26 to burn in the combustor 10. A ratio of an amount of fuel supplied to the combustor 10 divided by an amount of oxygen in the compressed oxidant stream 23 supplied to the combustor 10 is called a fuel to oxidant ratio. Controlling the fuel to oxidant ratio results in control of the burning process. For example, a lower fuel to oxidant ratio results in a more complete combustion of the fuel due to an abundance of oxygen.

The controller 22 receives an input regarding a combustor parameter and provides a control of the combustor 10 responsive to the combustor parameter to enhance the fuel to oxidant ratio. The combustor parameter includes, but is not limited to, a power level signal 30, an atmospheric pressure signal 32, a turbine inlet pressure signal 34, a turbine exhaust pressure signal 36, an oxygen level signal 38, a turbine inlet temperature signal 42, an inlet geometry signal 45 and a fuel flow signal 46. The inlet geometry signal 45 is sent from the combustor 10 to the controller 22. The inlet geometry signal 45 informs the controller 22 of the geometry of the air inlet device (not shown) of the compressor 18. The fuel flow signal 46 informs the controller of the fuel flow 26 to the combustor 10. In an exemplary embodiment, the controller 22 receives a plurality of combustor parameters from among those listed above to control the combustor 10 to enhance the fuel to oxidant ratio.

A premise of dry low NOx turbines is to reduce a flame temperature through an optimization of the fuel to oxidant ratio. The optimization of fuel to oxidant ratio requires a measurement of the amount of oxygen in the compressed oxidant stream 23 and measurement of the fuel flow 26 to the combustor 10 in conjunction with a control of either or both of the amount of oxygen in the compressed oxidant stream 23 and the fuel flow 26. An oxygen sensor 40 measures the amount of oxygen in the compressed oxidant stream 23 and produces the oxygen level signal 38 responsive to the amount of oxygen in the compressed oxidant stream 23. In an exemplary embodiment, the oxygen sensor 40 is a GE O2X1 oxygen analyzer, however, the use of other oxygen sensors is also contemplated. Additionally, oxygen level will vary if a substance other than atmospheric air is entering the compressor 18. Regardless of the substance entering the compressor 18, the oxygen sensor 40 is capable of producing the oxygen level signal 38, which the controller 22 corrects for atmospheric conditions to allow control of the fuel to oxidant ratio.

The oxygen level signal 38 is corrected for current atmospheric conditions by the controller 22. A reference oxygen level is measured on a reference day with reference parameters. The reference parameters include a reference turbine inlet pressure, a reference turbine exhaust temperature, and a reference atmospheric pressure. The controller 22 corrects the oxygen level signal 38 by providing an adjustment based on current conditions as indicated by the atmospheric pressure signal 32, the turbine inlet pressure signal 34, and the turbine exhaust pressure signal 36. The result of the adjustment is a corrected oxygen level. The corrected oxygen level indicates the amount of oxygen in the compressed oxidant stream 23.

An exemplary embodiment of the present invention employs a digital integrated system control General Electric Mark VI controller 22 to control the fuel flow 26 and/or the compressed oxidant stream 23 into the combustor 10 to enhance the fuel to oxidant ratio, thereby providing decreased NOx production with the greatest gas turbine engine efficiency. Although the controller 22 is described as the integrated system control General Electric Mark VI, the use of any other suitable controller is envisioned. Optimization of the fuel to oxidant ratio is a function of the power level of the gas turbine engine and the amount of oxygen available for combustion. In other words, there is a unique enhanced fuel to oxidant ratio for each power level of the gas turbine engine. The power level signal 30 is responsive to the power level of the gas turbine engine. The corrected oxygen level, derived from current atmospheric conditions and the oxygen level signal 38 indicates the amount of oxygen in the compressed oxidant stream 23. The controller 22 references power level signal 30 to access, from a data table within the controller 22, the enhanced fuel to oxidant ratio for a power level matching the power level signal 30. The turbine inlet temperature signal 42 is used as an indication of the fuel to oxidant ratio for a given power level of the gas turbine engine. Thus, the controller 22 compares the turbine inlet temperature signal 42 to a desired turbine inlet temperature for the power level corresponding to the power level signal 30. Matching the turbine inlet temperature signal 42 to the desired turbine inlet temperature for the power level corresponding to the power level signal 30 achieves the enhanced fuel to oxidant ratio. A temperature sensor 44 disposed at an inlet of the turbine 14 produces the turbine inlet temperature signal 42.

As stated above, matching the turbine inlet temperature signal 42 to the desired turbine inlet temperature for the power level corresponding to the power level signal 30 achieves the enhanced fuel to oxidant ratio. Thus, the controller 22 determines, based on the corrected oxygen level and the turbine inlet temperature signal 42, whether to adjust the fuel flow 26 or the compressed oxidant stream 23 to achieve the enhanced fuel to oxidant ratio for the power level matching the power level signal 30. A fuel flow adjustment signal 48 is used to adjust the fuel flow 26 to the combustor 10. The airflow adjustment signal 24 is used to adjust the geometry of the air inlet device (not shown) of the compressor 18, thereby adjusting the compressed oxidant stream 23. Thus, the controller 22 sustains a lean fuel-air mixture to reduce NOx formation, but prevents such phenomena as a flameout.

Controller 22 continuously receives current conditions to permit calculation of the corrected oxygen level. Controller 22 also continuously receives power level signal 30 to determine the enhanced fuel to oxidant ratio for the power level matching the power level signal 30 as indicated by the desired turbine inlet temperature. The enhanced fuel to oxidant ratio is achieved by continuously adjusting either or both of the fuel flow 26 or the compressed oxidant stream 23 to the combustor 10 as necessary to control the corrected oxygen level and turbine inlet temperature signal 42.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for controlling a combustor of a turbine engine, the combustor having a fuel to oxidant ratio, the fuel to oxidant ratio being defined as a ratio of an amount of fuel supplied to the combustor divided by an amount of oxygen in an oxidant stream supplied to the comnbustor, the method comprising:
controlling the fuel to oxidant ratio of the combustor of the turbine engine as a function of the amount of oxygen in the oxidant stream.

2. The method of claim 1, wherein said controlling the fuel to oxidant ratio of the combustor comprises controlling at least one of the amount of fuel supplied to the combustor and a flow of the oxidant stream to the combustor responsive to measuring a parameter.

3. The method of claim 2, wherein said measuring a parameter comprises at least one of:
measuring a power level of the turbine engine;
measuring a turbine inlet temperature; and
measuring the amount of oxygen in the oxidant stream to the combustor.

4. The method of claim 3, wherein said measuring the amount of oxygen in the oxidant stream further comprises:
sensing an oxygen level in the oxidant stream to produce a sensed level; and
correcting said sensed level if a current atmospheric condition requires correcting.

5. The method of claim 4, wherein said correcting said sensed level comprises adjusting said sensed level in response to the current atmospheric condition which differs from a reference atmospheric condition.

6. The method of claim 5, further comprises determining said current atmospheric condition via measuring at least one of an atmospheric pressure, a turbine exhaust pressure, and a turbine inlet pressure.

7. The method of claim 2, wherein said flow of the oxidant stream is controlled via changing a geometry of an air intake device.

8. The method of claim 2, further comprising adjusting at least one of the amount of fuel supplied to the combustor and said flow of the oxidant stream to the combustor to achieve an enhanced fuel to oxidant ratio.

9. The method of claim 8, wherein said enhanced fuel to oxidant ratio is dependent on a power level of the turbine engine.

10. The method of claim 9, wherein said enhanced fuel to oxidant ratio is achieved by adjusting at least one of the amount of fuel supplied to the combustor and said flow of the oxidant stream to the combustor until a turbine inlet temperature matches an enhanced turbine inlet temperature for the power level of the turbine engine.

11. The method of claim 1, wherein said controlling further comprises decreasing a production of Nitrogen compounds.

12. The method of claim 1, wherein said controlling the fuel to oxidant ratio of the combustor comprises controlling at least one of the amount of fuel supplied to the combustor and a flow of the oxidant stream to the combustor, said controlling responsive to:
sensing an oxygen level in the oxidant stream to produce a sensed level; and
correcting said sensed level if a current atmospheric condition required correcting.

13. The method of claim 1, further comprising:
compressing the oxidant stream;
wherein the controlling comprises controlling the fuel to oxidant ratio of the combustor of the turbine engine as a function of the amount of oxygen in the compressed oxidant stream.

14. A method for controlling a combustor of a turbine engine, the combustor having a fuel to oxidant ratio, the fuel to oxidant ratio being defined as a ratio of an amount of fuel supplied to the combustor divided by an amount of oxygen in an oxidant stream supplied to the combustor, the method comprising:
sensing an oxygen level in the oxidant stream to produce a sensed level;
correcting said sensed level if a current atmospheric condition requires correcting; and
controlling the fuel to oxidant ratio of the combustor of the turbine engine as a function of the amount of oxygen in the corrected sensed level.

15. The method of claim 14, wherein said controlling the fuel to oxidant ratio of the combustor comprises controlling at least one of the amount of fuel supplied to the combustor and a flow of the oxidant stream to the combustor.

16. The method of claim 14, wherein said correcting said sensed level comprises adjusting said sensed level in response to the current atmospheric condition which differs from a reference atmospheric condition.

17. The method of claim 16, further comprising determining said current atmospheric condition via measuring at least one of an atmospheric pressure, a turbine exhaust pressure, and a turbine inlet pressure.

18. The method of claim 15, further comprising adjusting at least one of the amount of fuel supplied to the combustor and said flow of the oxidant stream to the combustor to achieve an enhanced fuel to oxidant ratio.

19. The method of claim 18, wherein said enhanced fuel to oxidant ratio is dependent on a power level of the turbine engine.

20. The method of claim 19, wherein said enhanced fuel to oxidant ratio is achieved by adjusting at least one of the amount of fuel supplied to the combustor and said flow of the oxidant stream to the combustor until a turbine inlet temperature matches an enhanced turbine inlet temperature for the power level of the turbine engine.

* * * * *